June 19, 1928.  1,673,793
A. AMES, JR
BINOCULAR COMPOSITE PHOTOGRAPH AND METHOD OF AND APPARATUS FOR THE
PHOTOGRAPHY OF COMPOSITE PICTURES
Filed June 22, 1922  4 Sheets-Sheet 1

Inventor:
Adelbert Ames, Jr.
By Roberts, Roberts & Cushman
his attys.

Inventor:
Adelbert Ames, Jr.

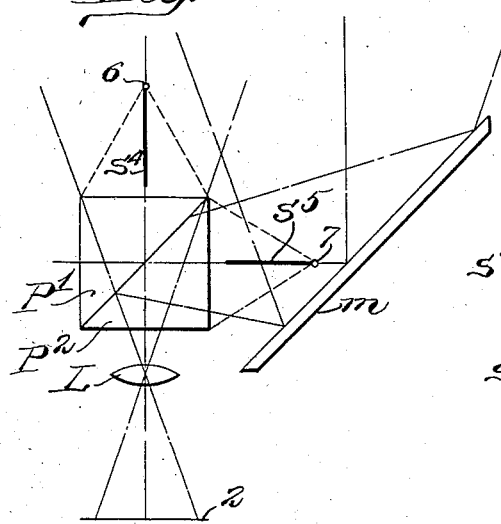
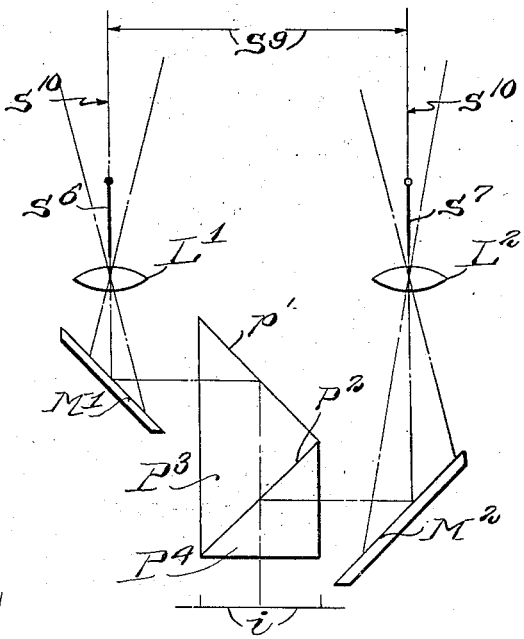
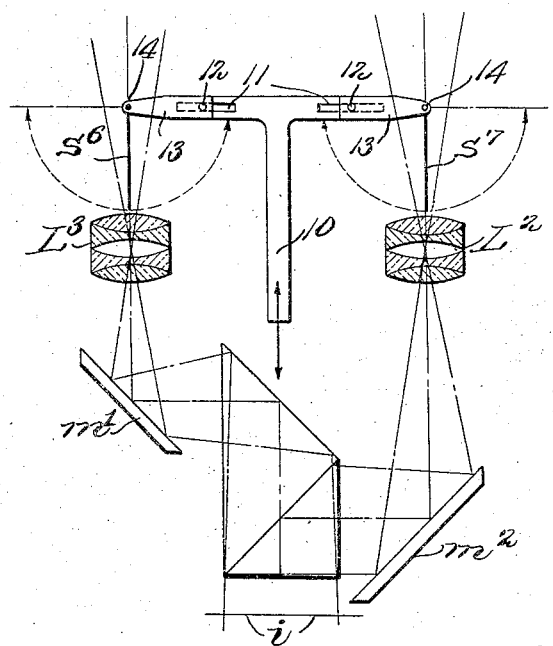
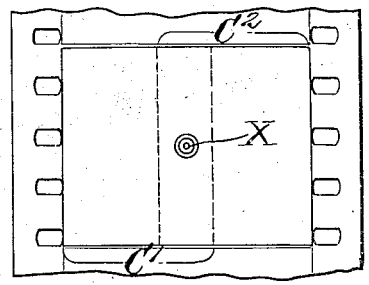

June 19, 1928.                                                          1,673,793
A. AMES, JR
BINOCULAR COMPOSITE PHOTOGRAPH AND METHOD OF AND APPARATUS FOR THE
PHOTOGRAPHY OF COMPOSITE PICTURES
Filed June 22, 1922                4 Sheets-Sheet 4
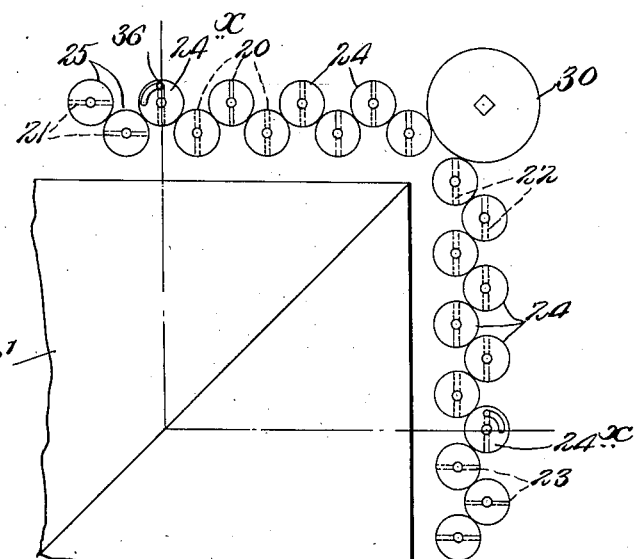
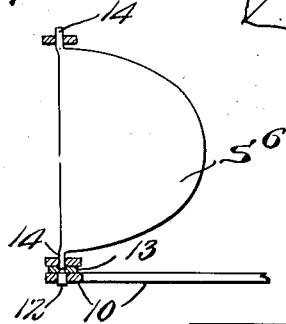
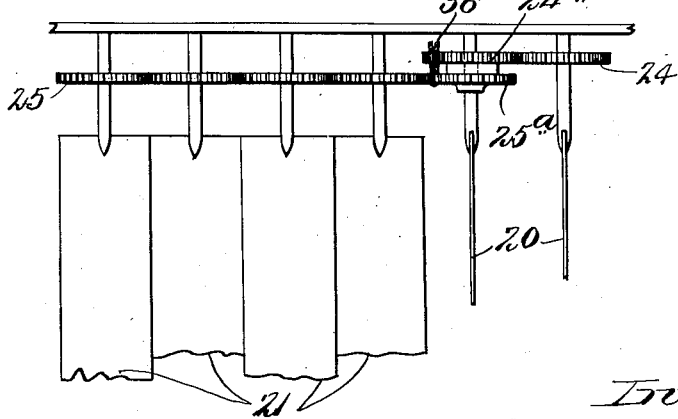

Patented June 19, 1928.

1,673,793

UNITED STATES PATENT OFFICE.

ADELBERT AMES, JR., OF HANOVER, NEW HAMPSHIRE.

BINOCULAR COMPOSITE PHOTOGRAPH AND METHOD OF AND APPARATUS FOR THE PHOTOGRAPHY OF COMPOSITE PICTURES.

Application filed June 22, 1922. Serial No. 570,046.

This invention relates to a binocular composite photograph and method of and apparatus for the photography of composite pictures.

I have discovered that the verity, the effective illusion of rotundity, effective illusion of distance, the effective submergence of the background, and other desirable qualities in a photographic picture may be improved by contriving that the picture shall be a composite of images from two points of view in which the resultant picture (or series of pictures, in the case of motion pictures) contains characteristics peculiar to normal binocular vision in the sense of depicting in the image qualities perceived in actual vision of the object by the cooperation of parts only of the retina of each eye.

Competent optical physicists have heretofore determined that the normal person is able to, and habitually does, inhibit the sensory impression of the image of an object viewed (especially upon first viewing an object not before under attention) in symmetrical and opposite fractions of the respective retinas of both eyes. Thus the sensory impression may be the binocular or perceptive composite of the two outer or temporal fractions of the retinas; or may be the binocular of the two inner or nasal fractions; or the whole impression perceived may be arrived at by alternating from one to the other of these kinds of binocular perception.

The normal habit of viewing an object may thus be said to be by various perceptions or sense-impressions of the object as imaged simultaneously upon the inner or nasal halves only of the retinal surfaces; or as viewed upon or perceived by the outer or temporal halves only of the respective retinas; or as perceived by the whole retinas cooperatively. First attentions at least may be accompanied by inhibitions of all of the sensory message of first one and then the other eye, but the first impression, and perhaps, in many cases, any attentive perception, is a composite of binocular images by lateral fractions of the retina only. Normal vision thus proceeds upon a series of beginning impressions in which the sensory machinery is inhibited, as will presently be shown, in respect to a wide point of view or inhibited in respect to a narrow point of view, as well as upon monocular or whole-retina binocular perceptions. In the eyes, of course, the optical axes, converging upon the same object at the center of interest during first one and then another of these inhibitions of lateral fractions of the retinal impression, are not physically shifted in respect to the axis of the eye-lens and the retinal surface. The eye-image of an object of interest in the object field is therefore not actually and physically shifted from one part of the retina to the other part by motion or accommodation of the eye; but the retinal areas temporarily inhibited from sensory function are alternated, to effect the same result.

It will be hereinafter pointed out that the images as actually perceived by the eyes under these circumstances are quite different in drawing or geometrical qualities in the case of inhibition of symmetrical temporal halves of the retinal perception, from what they are in case of inhibition of the nasal halves of the retinal impression, or in case of monocular vision, or whole-retina binocular-vision. The composite images so perceived have qualities which convey the facts of rotundity and distance of the object independently of other factors, such as the sense of convergence of the eye axes, and the aberrations of the images of objects away from the axis.

A principal object of this invention is to provide a way of picturing by photography differing composite binocular impressions, of the same character as these visual part-retinal images, for the purpose of fundamentally improving the graphic quality of the photograph, particularly in respect to rotundity, verity, and separation from the background of that part of the object-field pictured upon which attention is to be directed. This invention therefore provides a photographic method and apparatus ancillary thereto for making, and a binocular composite picture resulting from, simultaneous images differing in respect to the point of view; and may provide a series of such pictures, such as a strip of motion picture film, which shall bear in the proper order, composite pictures of the same object field viewed under circumstances representative of the varied or oscillating attention naturally and normally given the object. A further object of the invention is to obtain by photography pictures having the effect, in a perceptive sense, of new attention upon an object. A further object is to provide a method of and apparatus for making composite photographs characterized by components severally contributing different parts of the picture, parts only of the respective components of the composite photograph overlapping in a resultant binocular picture. A further object is to provide a mode of making a composite photograph from two different points of view in which the components of the composite are respectively predominant in different lateral parts of the picture or image respectively.

The generic invention will be explained with the aid of description of certain specific forms of apparatus only, and in connection with certain specific methods or procedures only, resulting in forming composite pictures of the kind referred to.

In the accompanying drawings,

Fig. 1 is a diagram in plan, angles being exaggerated, for aid in explaining the phenomena of human binocular vision above referred to;

Fig. 6 is a diagram in plan illustrating another form of apparatus for practising the method and producing the effect;

Fig. 7 is a similar plan illustrating another form of apparatus for practising the method and producing the effect mentioned;

Fig. 8 is a detail plan of apparatus according to Fig. 7 for producing the effect;

Fig. 9 is a detail section in elevation of one of the shutters shown in Fig. 8;

Fig. 10 is a detail plan of other apparatus for producing the effect;

Fig. 11 is an enlarged detail in plan of a part shown in Fig. 10;

Fig. 12 is a detail elevation of said parts; and

Fig. 13 is a diagram of the kind of photographic picture made by the described method.

Figure 1:
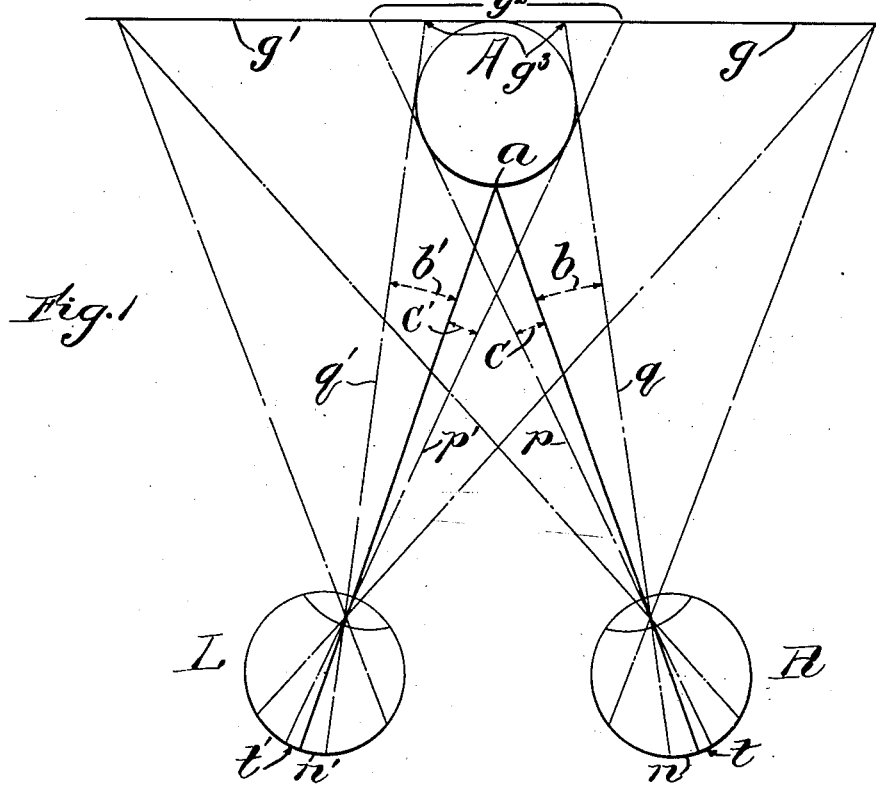

Referring now to Fig. 1, if L and R represent a pair of normal human eyes, and the point $a$ represents the exact center of interest in an object A having rotundity or depth, which the eyes L, R observe, it will be apparent that the image of the object A in the eye R, if the eyes are axially directed at the point of interest, will lie predominantly upon the nasal half $n$ of the retina of the eye R, and predominantly upon the nasal half $n'$ of the eye L. So far as effective perception is concerned, however, the composite or binocular image of the object A will be completely perceived if the temporal halves $t$, $t'$ of the retinas do not perceive; or, alternatively, will be completely perceived if the nasal halves $n$, $n'$ of the retinal regions do not perceive, since in each of these cases the entire surface of the object and all of the field of view is represented in images in one or in the other eye, which images combine together for one composite sensory impression.

But the composite image perceived by the cooperation of the temporal halves $t$, $t'$, only of the retinas is an image of a different character from the composite image perceived only by the nasal halves $n$, $n'$ of the retinas. The composite perceived by the nasal portions $n$, $n'$ of the retina in the specific instance given has the angular magnitude of the sum of the angles $b$, $b'$ intercepted between the respective axial directions to the point $a$ and the tangents $q$, $q'$ respectively marginal to the images of the round object A. The images included in these angles of view supplement each other for the impression of rotundity and form of the object A, but severally their lateral angular dimensions in the retinal image, granting blindness on the temporal halves $t$, $t'$ of the retina, is the angular magnitude only of one of the angles $b$ or $b'$.

But in the case the image is perceived only by the temporal fractions of the retinas, the angular magnitude of the actual image is that only of one of the angles $c$, $c'$ between the axial direction of the point $a$ and the respective tangents $p$, $p'$ to the round body A.

One result of this is that vision perceived only by the nasal fractions of the retina is vision that sees further around any such object as the hypothetical round body A than is vision which is perceived only by the temporal fractions $t$, $t'$ of the retinas. Another result is that the portions $g$, $g'$ of the background are severally perceived as monocular images, one by one eye, and one by the other eye. The parts $g^2$, $g^3$, of the background respectively occluded by the object A also differ accordingly as vision is by the nasal or temporal fractions. This will be apparent from considering the intercepts between the respective marginal tangents $p$, $p'$ and $q$, $q'$ to the surface of the hypothetical object A, viewed respectively by the temporal fractions $t$, $t'$ and the nasal fractions $n$, $n'$ of the retinas. It is therefore apparent that the quality, the drawing, the geometrical outline, and the background objects appearing in an image perceived of an object having depth is different, in the case of perception by a composite image occupying the outlying halves of the sensitive surfaces, from what it is when the perception is by a composite image occupying the internal halves only of the sensitive surfaces; and that either such composite image differs from the binocular perception by the full retinal surfaces and differs from monocular perception.

Figure 2:
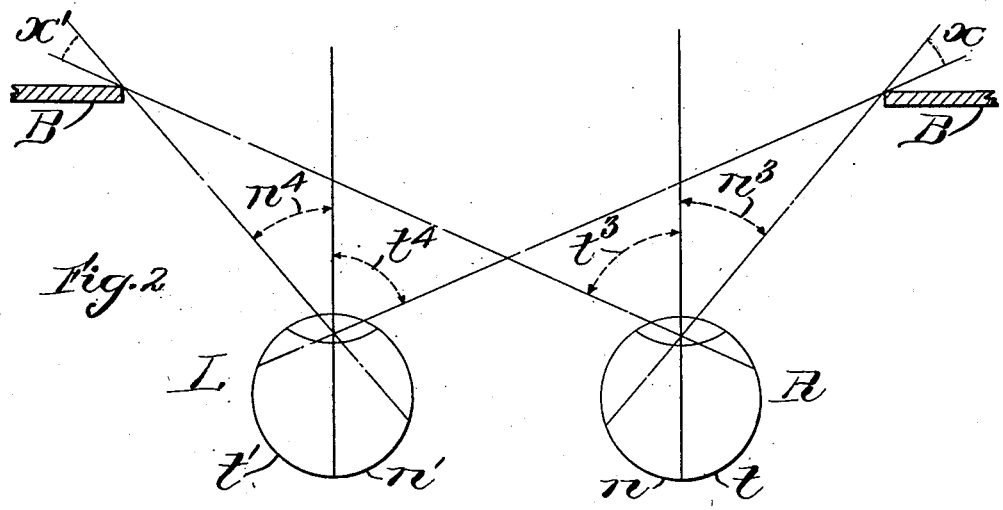
Fig. 2 is a diagram of the same character illustrating certain other qualifications of normal human vision.

Not only the sense of roundness but the perception of relationship of nearer objects to their backgrounds is affected according to whether the composite perception is perception by one eye, by the full retinal surface of both eyes, by the outlying temporal fractions, or by the interior or nasal fractions of the two retinal surfaces. Referring to Fig. 2, this will be made plain by considering the angle of view permitted by the aperture in the screen B. In the case of perception by the nasal fractions $n$, $n'$ only of the retinas of the eyes L, R, then the angle of view is the sum of the angles $n^3$ and $n^4$; whereas in the case of composite vision only by the temporal fractions $t$, $t'$, the angle of view is the larger sum of the angles $t^3$ and $t^4$. The angle of view perceived in any case represents the whole angular extent of the object-field capable of being viewed through the opening in the screen B. In the one case all of the object-field behind the screen represented by the angles $x$, $x'$ is visible through the opening in the screen, while in the other case this portion of the object-field is occluded and invisible.

It will now be plain that composite images of which the components are fraction of the image field behind the lens, whether simultaneous or perceived in succession, are very different, both as respects the extent to which vision of the lateral or receding sides of deep objects, and vision of the background behind nearby objects, is concerned. A composite photograph, for instance, made up of binocular images of which the interior halves between the optical axes of two lenses are excluded from participation in the result, is a very different picture from a composite made when the exterior halves of the images outside of the optical axes of the lenses are excluded from the composite. In each case the composite image will be binocular, will give the effect of rotundity, and will give the effect of convergence upon and good definition at the point of fixation in the object field; but the actual contents of one of these composites will be different from the actual contents of the other in the sense explained above in connection with the optics of perception of two eyes.

This relationship between the partial components of such a composite holds good whether there are actually two lenses or virtually two lenses in use when the binocular composite is made, for instance, by the superposition of images formed by a single lens into which both a direct and a reflected laterally-displaced beam may be directed.

I make use of these differences in the appearance of objects when viewed binocularly in two regions severally lying between or outside of the axes of two lenses laterally spaced apart to form composite pictures, in which the parts to the right of the attention-point or center of interest, such as the point $a$ in Fig. 1, are photographed in one lateral half of the image field of a lens; and the parts of the object-field lying to the left of the attention-point are photographed in the corresponding lateral half of the image field of another lens laterally displaced from the first lens by a distance corresponding to greater or less than the distance between the eyes. Fig. 13 shows such a photograph in diagram. The region of the attention-point at X is thus photographed at or near one lateral margin of a component image $C^1$ made by one lens, and the same region is photographed at or near the corresponding opposite lateral margin of the component image $C^2$ made by the other lens; the components are superposed in the region C, so as to be in registry at the attention-point; and the resulting picture then has the qualities explained above.

These images may be superposed originally on the sensitive surface by reflection in front of or behind the lenses, or they may be superposed secondarily by double exposure, or by double printing of positives, or double projection.

Two lenses may, and in some cases are preferably replaced by reflection devices causing the binocular aspect of the same object field by direct and reflected images to be formed in superposition in the same image-space by one lens only.

Figure 3:
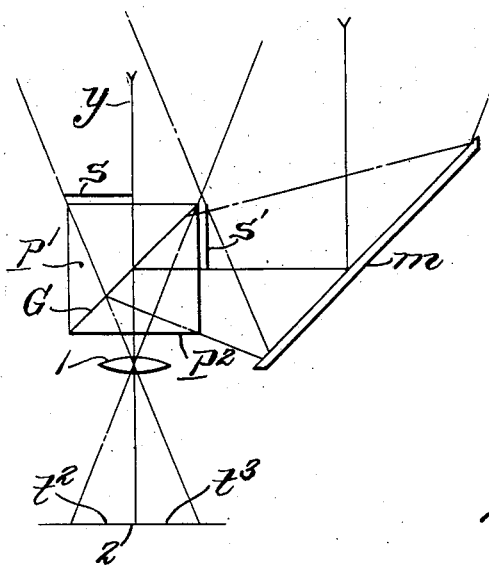
Fig. 3 is a diagram plan of one species of apparatus for composite photography illustrating one method of producing the illusion of partial-retinal binocular vision.

Referring now to Fig. 3 for instance, this diagram shows the essentials of the arrangement of a camera for binocular photography forming the subject of the application for patent Serial No. 474,560, filed June 2, 1921 by Charles A. Proctor and myself, comprising a photographic lens L, means for supporting a sensitive surface 2, a pair of 45° prisms $P^1$, $P^2$ having a light dividing hypothenuse surface G, and having a laterally displaced mirror $m$ by means of which images can be simultaneously formed on the surface 2 from the two points of view represented by the real axis of the lens L and the virtual axis of the lens as reflected in the mirror $m$.

If now the field of the lens L is occluded by a screen $s$ in the direct beam and is also occluded by a screen $s'$ in the reflected beam, the parts in the image plane represented by $t^2$, $t^3$, respectively will correspond to the perceiving temporal retinal fractions of binocular vision. When the direct and the virtual axes of the lens are converged (by moving the mirror $m$) on the same object the images on the surface 2 will be in coincidence.

Figure 4:
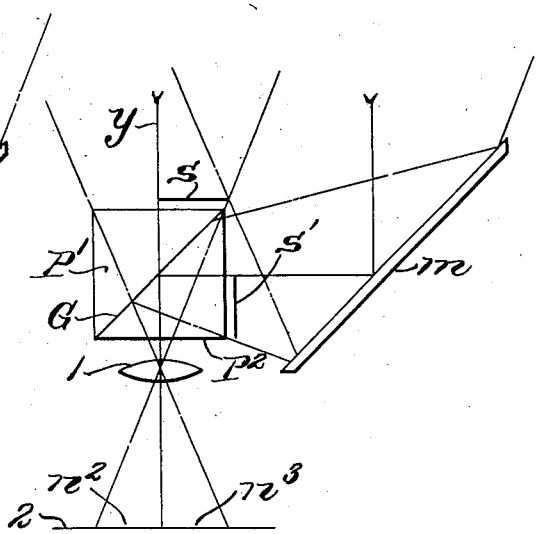
Fig. 4 is a similar diagram illustrating another position of the apparatus and another step in the method.

Referring now to Fig. 4, if without other change the screens $s$, $s'$ are moved respectively to the right and downward as shown in the figure, then the corresponding regions on the surface 2 as shown at $n^2$, $n^3$ will respectively bear images corresponding to the eye images in the nasal retinal halves of binocular vision.

It is preferred to adjust the edges of such screens as those shown at $s$ and $s'$ in relation to each other and the real and virtual axes of the lens 1 so as to make the illumination on the surface 2 even from side to side, the penumbra of the edge of the screen for the direct beam diminishing correspondingly to the penumbra for the edge of the reflected beam. The penumbral edges of the several images at $t^2$, $t^3$, or $n^2$, $n^3$ therefore overlap, and it will be noted that this overlapment see Fig. 13, includes the part of the image X in the direct axis $y$ of the lens L, and includes the center of attention whenever this axis is directed to the center of attention.

Figure 5:
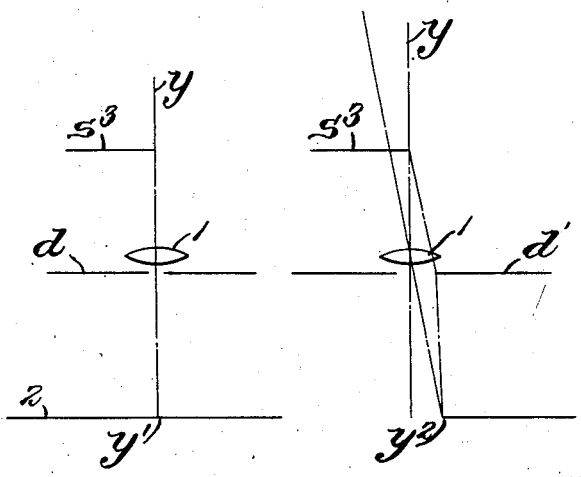
Fig. 5 is a diagram illustrating the effect of the aperture of the lens employed in a camera in respect to the result to be accomplished.

The penumbral effect of screens so placed will be better understood from Fig. 5. As therein shown a screen $s^3$ terminating at the axis $y$ of the lens 1 having diaphragm $d$ with a relatively small aperture is photographed on the surface 2, the shadow of the screen $s^3$ ending sharply at $y'$. But if the diaphragm is a diaphragm $d'$ having a wider aperture, then the full shadow of the screen $s^3$ is displaced to the right to the point $y^2$, about half the aperture of the lens. The further away from the lens 1 the screen $s^3$ is placed, the less will be this displacement. It will therefore be seen that the axial position of the screen and the aperture of the lens are important factors.

In Fig. 6 I have indicated in diagram a further arrangement in which screens $s^4$, $s^5$ are respectively pivoted at 6 and 7 in the direct and virtual axes respectively of the lens 1. These screens may be swung from side to side to make composite exposures on the surface 2 of the nasal-fraction binocular or temporal-fraction binocular images respectively.

In either case a camera having the arrangements indicated in diagram will produce a negative which to the right of the center of attention is predominantly the effect of light collected along an axis representing one point of view and to the left of the attention center is predominantly the effect of light collected along the other point of view. The result of this is to present in the photograph, instead of the single projection of the usual monocular lens, a rotund picture of the object at the crossing point of the directed and the reflected optical axes and which, as a consequence of the optical peculiarities of the image so formed, is illusive of two-eyed vision, such an object standing away from its background and being broadened by the increased angle of view with which it is perceived entirely in accordance with normal human vision of such an object.

For motion pictures, it is possible with the aid of this invention to closely simulate the effect of new attention upon an object, by imitating the normal visual oscillation mentioned above. A picture or succession of pictures, like Fig. 13 for instance, may be taken with composites such as those described in which the respective images are stopped off to correspond to inhibition of the nasal retinal fraction; and then another series taken in which the stopping off corresponds to inhibition of the temporal retinal fraction. Such pictures may be succeeded by full binocular photographs, the composites being in registry on the attention point, but I prefer to continue the composite photography by half images from the respective points of view as above explained in any case in which it is desirable to concentrate interest on a figure or object in the object field, as contradistinguished from attempting to photograph the whole object field in general.

The method is susceptible of being practiced by many different arrangements of apparatus. For example, Figs. 7 and 8 show in diagram in plan a camera having like lenses $L^1$ and $L^2$ axially displaced laterally, the image-bearing light from each being brought into central coincidence by plane mirrors $m'$, $m^2$, and the inclined reflection surfaces $p^1$ and $p^2$ of the prisms $P^3$ and $P^4$, of which the surface $p^2$ may be a half-silvered or other light-dividing surface. Shutters $s^6$ and $s^7$ pivoted vertically in the axial planes of the respective lenses when swung respectively away from or toward the plane between the lenses will thus have the effect of occluding the outer and inner halves of the respective lenses and their images, and thus causing the composite image at $i$ to be deprived of any contributing component at the right side of $i$ due to lens $L^2$, or at the left side of $i$ due to lens $L^1$, and vice versa. With this arrangement of lenses, the shutters $s^6$, $s^7$ cause the same effect in their inner position as would the interposition of a single opaque screen at the line $s^9$; and in their outer positions as would opaque screens at lines $s^{10}$, Fig. 7; and any shutter or obstruction at such positions may be relied upon. As indicated in Figs. 8 and 9, the preferred shutters $s^6$, $s^7$ may be swung by a T-shaped slide 10 having slots 11 for pins 12 on arms 13 fast on the axes 14 of the suitably mounted shutter, to secure symmetrical movement.

While in the preferred arrangements mentioned the interruption of the light for one fraction of each of the component images has been described as absolute, being the result of interposing an opaque screen, it will be obvious that the partial suppression of this light will gain many of the described advantages. For example, in the apparatus and method of Figs. 3, 4, 6, 7, 8 and 9, the screens shown may be semi-transparent, or may vary laterally from partial transparency to complete opacity, and then will result in images having their respective parts diminished in intensity accordingly, the undiminished companion image from the other point of view remaining predominant.

In the arrangement of Figs. 3, 4 and 6, the desired effect may be attained by preferred means shown in Figs. 10, 11 and 12.

Fig. 10 is an enlarged detail plan showing series of flat shutters 20, 21, 22, 23 mounted for rotation on vertical axes, and together capable of intercepting all the incident light falling on the respective faces of the prisms $P^1$, $P^2$ also shown in diagram in Figs. 3, 4 and 6. These shutters are interconnected by gear-trains 24, 25 adapted to be moved by a driver 30, and meshing with adjacent members of train 24. I do not herein claim, except as adapted to the present purpose, a shutter mechanism of this character, which is described and claimed in my application Serial No. 510,286 filed Oct. 25, 1921.

For the present purposes, it is desired to so actuate the shutters 20, 21, 22, 23 as to close the path to the left-hand part of the face of prism $P^1$ and the path to the upper part of the face of prism $P^2$ simultaneously; and to close the remaining spaces, respectively when the said parts of the prism-faces are exposed. This is conveniently done, see Figs. 11 and 12, by interposing between the trains of gears 24, 25, respectively, a connection adapted to orient the section 25 of the train furthest from the driver 30 at a position 90° away from the position in which the respective shutters 20 and 21, 22 and 23 are parallel. The connection shown consists of a gear $24^x$, last in the trains 24, and loose on its spindle, adjustably connected to gear $25^a$, fast on the same spindle, constituting the first member of the train 25. The connection may be adjustably made by a cone-headed screw 36 in gear $25^a$, taking into a sector slot 37 in gear $25^x$, as shown in Fig. 11.

In operation, it will be understood that movement of gear 30 corresponding to 90° of rotation of the shutters 20, 21, 22 and 23 will cause these shutters collectively either to interrupt or to expose the left-hand half of the direct beam to the prisms and the upper half of the reflected beam to the prism, and thus, see Fig. 6, cause the image to consist of a direct-beam half and a reflected-beam half in overlapping relation on the axis of the lens L, these halves being interchangeable in respect to contribution to their illumination by the direct and the reflected beams by moving the driver 30 through a sufficient distance to shift the gear-trains through 90°.

What I claim is:

1. A composite photograph having components representative of different points of view, the respective components being in registry at a center of attention, and each component being severally predominant in outlying portions of the photograph.

2. A composite photograph in which one lateral fraction is the record of an image from one point of view, in which another lateral fraction is the record of an image from a point of view laterally displaced from the first point of view and in which an area including a center of attention from said points of view severally is a composite record of the contents of both images.

3. A series of composite photographs giving the illusion of rotundity and separation from the background of an object at the center of interest and comprising severally composite photographs of images of the objects from laterally separated points of view in coincidence in respect to the image of the object, each of the component images of each composite being occluded in a region of the picture in which the other component is predominant.

4. A series of composite photographs giving the illusion of rotundity and separation from the background of an object at the center of interest and comprising severally composite photographs of images of the objects from laterally separated points of view in coincidence in respect to the image of the object, each of the component images of each composite being occluded in a region of the picture in which the other component is predominant, the series of pictures containing in succession photographs in which the respective component images are predominant on one side and on the other side of the object at the center of interest.

5. The art of making composite images for photography comprising projection upon a surface of complementary partially overlapping images respectively from two different points of view, the overlapping portions of the images containing the axial region of the respective images.

6. The art of making composite images for photography comprising projection upon a surface of simultaneous images of the object-field from laterally separated points of view, symmetrical fractions of the image-field being occluded in respect to the respective points of view.

7. The art of making composite images for photography comprising the projection upon a surface of simultaneous complementary fractions of images from laterally separated points of view, the images being formed by a single image former and the axial region of the images being in coincidence.

8. The art of making series of composite photographs comprising the projection upon a surface of complementary fractions of images respectively from different points of view, the images being coincident in their axial regions, a photograph or photographs of such a series being succeeded by a photograph or photographs in which the respective complementary fractions exposed are the remainders of the images not exposed in the first instance.

9. The art of photography comprising forming by an image former and recording as simultaneous composites in coalescence, images covering respectively fractions of the field of view, these images overlapping at and near the axial region of the image former.

10. The art of making photographs imitating part-retinal binocular vision comprising forming a plurality of images from laterally separated points of view, light from symmetrically opposite fractions of the object-field being occluded in the perspective images, the images being so related to each other that portions representing the axial lines of sight are in coincidence in the respective images.

11. That method of making photographs giving the illusion of rotundity and separation from the background of an object at the center of interest which consists in photographing the object simultaneously from laterally separated points of view, occluding in respect to each point of view symmetrically opposite fractions of the object-field, and causing the respective images to overlap in registry at parts containing the images respectively of a center of interest in the object field.

12. Apparatus for making composite photographs comprising means for forming and projecting upon the same image space images of the same object-field from laterally separated points of view having therein, in combination, means for occluding separately opposite fractions of the respective images.

13. Apparatus for making composite photographs comprising means for forming and projecting upon the same image space images of the same object-field from laterally separated points of view having therein, in combination, between the image former and the object-field, means for occluding separately opposite fractions of the respective images.

14. Apparatus for making composite photographs comprising means for forming and projecting upon the same image space images of the same object-field from laterally separated points of view, having therein shutters adapted to exclude light from opposite sides of the object-field from reaching the respective points of view.

15. Apparatus for making composite photographs comprising means for forming and projecting upon the same image space images of the same object-field from laterally separated points of view, having therein shutters adapted to exclude light from opposite sides of the object-field, from reaching the respective points of view, and means for adjusting the shutters respectively to opposite positions.

Signed by me at Hanover, N. H., this sixteenth day of June, 1922.

ADELBERT AMES, Jr.